United States Patent [19]

Kobayashi et al.

[11] 4,079,433

[45] Mar. 14, 1978

[54] PROTECTIVE RELAYING APPARATUS FOR ELECTRIC POWER SYSTEMS

[75] Inventors: Takayuki Kobayashi; Shigeru Suzuki, both of Fuchu, Japan

[73] Assignee: Tokyo Shibaura Denki Kabushiki Kaisha, Japan

[21] Appl. No.: 718,004

[22] Filed: Aug. 26, 1976

[30] Foreign Application Priority Data

Aug. 30, 1975 Japan .................. 50-105131

[51] Int. Cl.² .............................................. H02H 3/26
[52] U.S. Cl. ........................................ 361/78; 361/80
[58] Field of Search ................. 361/78, 79, 80, 82, 361/83, 84, 86, 87, 88, 89, 93, 94, 98; 307/355; 328/159, 160

[56] References Cited

U.S. PATENT DOCUMENTS 2,985,801  5/1961  Warrington ........................... 361/82
3,048,744  8/1962  Warrington ....................... 361/82 X

FOREIGN PATENT DOCUMENTS 22,668   7/1970   Japan ..................................... 361/80
202,286  12/1966  U.S.S.R. ................................ 361/82

Primary Examiner—Harry E. Moose, Jr.
Attorney, Agent, or Firm—Stevens, Davis, Miller & Mosher

[57] ABSTRACT

A static circuit comprising an input transformation circuit responsive to current or voltage derived from an electric power system to be protected for producing a first pair of electric quantities having a phase difference of $\theta$ and a second pair of electric quantities dephased by $\phi$ from the first pair of electric quantities respectively, a pair of multipliers for the producing products of the first and second pair of electric quantities, and an adder or subtractor for producing the difference of these products.

4 Claims, 9 Drawing Figures

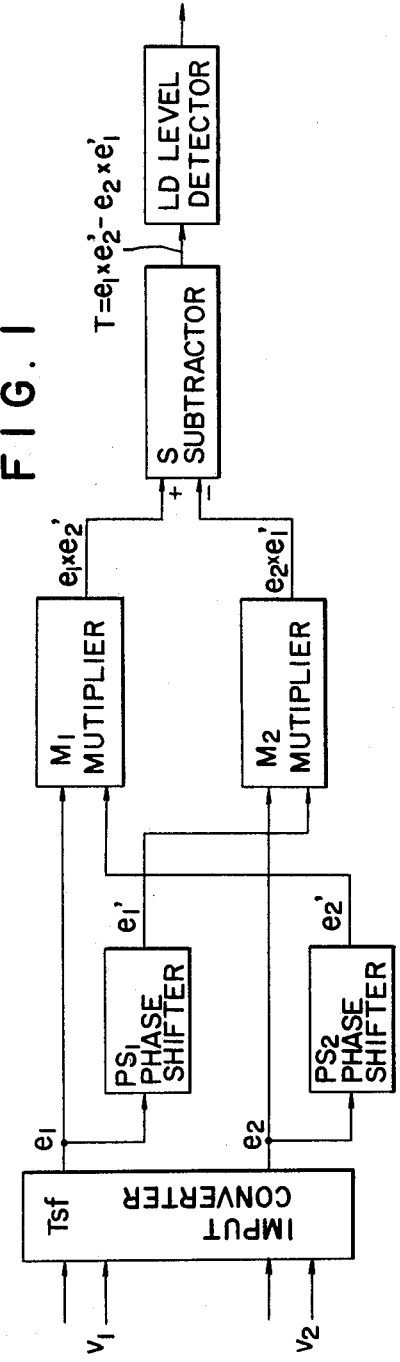
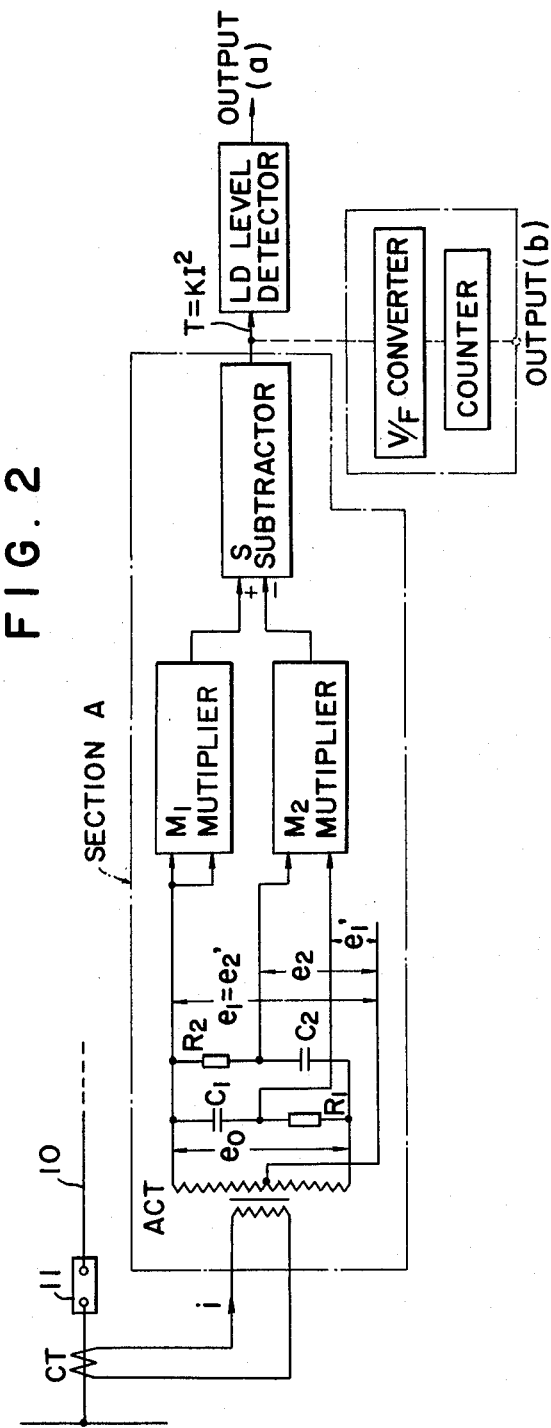

PROTECTIVE RELAYING APPARATUS FOR ELECTRIC POWER SYSTEMS

BACKGROUND OF THE INVENTION

This invention relates to protective relaying apparatus for an electric power system, and more particularly to protective relaying apparatus for detecting a fault or locating the fault.

With the recent increase in power demand, the importance of protective relaying apparatus in electric power systems has increased. Thus, the protective relaying apparatus are required to have better operating characteristics. For this reason, it is a recent trend to substitute relaying apparatus utilizing electronic elements such as transistors or the like for the electromagnetic mechanical type in view of the operating speed, the burden of the relay circuit, and the sensitivity of the relaying apparatus. Prior art relaying apparatus can be classified into the following two types but each of them has the following defects.

A. Electromagnetic mechanical relay

1. This type involves mechanical problems such as chattering and bouncing of the contact, deterioration of the characteristics due to the inertia and friction of the movable contact and misoperation due to vibration and shock.

2. It is difficult to provide high sensitivity unless the burden of the input circuit is increased. However, it is impossible to increase the burden beyond a certain limit.

3. It is difficult to provide high speed operation because energy is necessary to accelerate the movable contact. Moreover, the delay in operation of the relay is of long duration especially under low input condition.

B. Transistor type relay

1. This type is influenced by higher harmonics. Usually, since the instantaneous value is measured any distortion of the waveform greatly affects the operating characteristic of the relay.

2. Liable to be affected by an external surge.

Where a timer circuit is used to produce a continuous signal, mis-operation and improper reset will result due to an induction surge. For this reason, it is necessary to use a flux separator or a surge absorber.

SUMMARY OF THE INVENTION

Accordingly, it is an object of this invention to provide improved protective relaying apparatus utilizing a simple static circuit and which is free from the difficulties of the electromechanical and transistor types.

Another object of this invention is to provide protective relaying apparatus capable of operating under a low burden, and at high sensitivities and at high speeds and which are not affected by higher harmonics and induction surges.

According to this invention there is provided protective relaying apparatus for an electric power system comprising an input transformation circuit responsive to electric quantities derived from the power system for producing a first pair of electric quantities having a phase difference $\theta$ and a second pair of electric quantities dephased by $\phi$ from the first pair of electric quantities respectively, a pair of multipliers for producing the products of the first and second pair of electric quantities and an addition-subtraction circuit for producing the algebraic difference of the outputs of the two multipliers.

BRIEF DESCRIPTION OF THE DRAWINGS

In the accompanying drawings:

FIG. 1 is a block diagram showing the basic construction of this invention;

FIG. 2 is a connection diagram showing an overcurrent relay embodying the invention;

DESCRIPTION OF THE PREFERRED EMBODIMENTS

Figure 3:
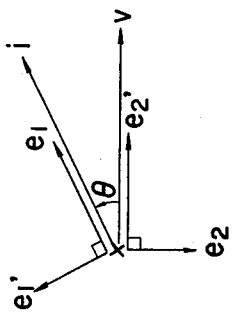
FIG. 3 is a vector diagram showing the relationships of various electric quantities of the embodiment shown in FIG. 2.

In the basic construction of this invention shown in FIG. 1, input electric quantities $v_1$ and $v_2$, generally comprising combinations of voltages or currents, are converted into two electric quantities $e_1$ and $e_2$ by an input converter Tsf which is constructed not only to vary the magnitude and phase but also to synthesize vectors. The outputs $e_1$ and $e_2$ of the input converter are applied to phase shifting circuits PS$_1$ and PS$_2$, respectively. Although the phase shifting circuits may be constructed to vary the magnitudes of the outputs, for the sake of description, it is assumed herein that they advance the phase angles of the outputs by 90°.

The outputs of the phase shifting circuits PS$_1$ and PS$_2$ are applied to multipliers M$_1$ and M$_2$ which produce outputs $e_1 \times e'_2$ and $e_2 \times e'_1$, respectively. These outputs are applied to a subtractor S to produce an output $$e_1 \times e'_2 - e_2 \times e'_1 = T$$

which is applied to a level detector LD which produces an output when the output T of the subtractor S exceeds a predetermined value To.

The apparatus shown in FIG. 1 operates as follows. Since there are many methods to convert the input electric quantities into outputs $e_1$ and $e_2$, only the operation of the circuit elements on the output side of the converter will be considered.

The instantaneous values of the outputs $e_1$ and $e_2$ are expressed by the following equations $$e_1 = E_1 \sin \omega t$$

$$e_2 = E_2 \sin (\omega t - \theta)$$

where $E_1$ and $E_2$ represent the amplitudes of the outputs $e_1$ and $e_2$, respectively, $\omega$ the angular velocity, $\theta$ the lagging angle of $e_2$ with respect to $e_1$ and $t$ the time.

As the phase shifting circuits PS$_1$ and PS$_2$ advance the phase angles of the outputs $e_1$ and $e_2$ by 90° without changing their magnitudes, the instantaneous values of the outputs $e'_1$ and $e'_2$ of the phase shifting circuits $PS_1$ and $PS_2$ are expressed by the following equations $$e'_1 = E_1 \sin(\omega t + 90°)$$

$$e'_2 = E_2 \sin(\omega t - \theta + 90°)$$

As a consequence the output T of the subtractor S is given by $$T = e_1 \times e'_2 - e_2 \times e'_1 = E_1 \sin \omega t \times E_2 \sin(\omega t - \theta + 90°) - E_2 \sin(\omega t - \theta) \times E_1 \sin(\omega t + 90°) = E_1 E_2 \{\sin \omega t \times \cos(\omega t - \theta) - \sin(\omega t - \theta) \times \cos \omega t\} = E_1 E_2 \sin \theta.$$

Thus, even when AC electric quantities are applied, the instantaneous value of the output T of the subtractor S is constant and does not contain any oscillating component. Accordingly, by constructing the level detector LD to produce an output when the level of the output T exceeds a predetermined value $T_o$ there is provided a product responsive type relay which operates when $$E_1 E_2 \sin \theta - T_2 \geq 0$$

Although the principle of operation of this relay is similar to that of a well known induction relay, when the relay circuit is constituted by a static circuit it is possible to eliminate the problems of chattering and bouncing of the movable contacts which are inherent to a mechanical induction relay.

FIG. 2 shows the circuit of an overcurrent relay embodying the principle of the circuit shown in FIG. 1. More particularly, the current of a transmission line or a distribution line 10 is transformed into a current $i$ by a current transformer CT, and when an overcurrent condition occurs a circuit breaker 11 is tripped to protect the circuit.

The input current $i$ to the overcurrent relay is converted into four electric quantities $e_1, e_2, e'_1$ and $e'_2$ by an auxiliary transformer ACT, and capacitors $C_1$ and $C_2$ and resistors $R_1$ and $R_2$ which are connected on the secondary side of the auxiliary transformer ACT. These four electric quantities can be expressed by the following four equations by establishing the relations $$e|(c_1)| = e|(R)|, \text{ and } e|(c_2)| = e|(R_2)|$$

where $e(c_1)$, $e(c_2)$, $e(R_1)$ and $e(R_2)$ represent the fractional voltages formed by dividing the output voltage $e_o$ of the auxiliary transformer ACT by capacitor $C_1$ and $C_2$ and resistors $R_1$ and $R_2$ as shown in FIG. 3

$$e_1 = E_1 \sin \omega t$$

$$e_2 = E_1 \sin(\omega t - 90°)$$

$$e'_1 = E_1 \sin(\omega t + 90°)$$

$$e'_2 = E_1 \sin \omega t$$

where $E_1$ represents the amplitude of the voltage $e_1$.

Like the circuit shown in FIG. 1, multipliers $M_1$ and $M_2$ calculate the products $e_1 \times e'_2$ and $e_2 \times e'_1$, respectively, and subtractor S produces the difference of these products $$T = e_1 \times e'_2 - e_2 \times e'_1$$

and the instantaneous value of this output is expressed as follows $$T = E_1 \sin \omega t \times E_1 \sin \omega t - E_1 \sin(\omega t - 90°) \times E_1 \sin(\omega t + 90°) = E_1^2 \sin 90° = E_1^2$$

Since $E_1$ is proportional to the amplitude $I$ of the input current $i$, the output T can be expressed as $T = KI^2$.

For the purpose of description, elements connected between the auxiliary transformer or the transformation circuit ACT and the subtractor S and bounded by dot and dash lines are hereinafter termed section A.

As above described, the level detector LD is constructed to produce an output ($a$) when the output T exceeds a predetermined value $T_o$, thus providing a judgement factor $KI^2 - T_o \geq 0$. In this manner, an overcurrent relay is provided.

Figure 4:
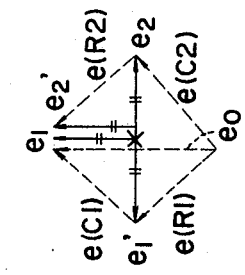
FIG. 4 shows a partial modification of the embodiment shown in FIG. 2.

It is also possible to obtain an inverse time characteristic by producing an output ($b$) from the output T of the subtractor S. One method of forming the output ($b$) is shown in FIG. 2. Thus, the output T is converted into a pulse train having a frequency proportional to the voltage by a V/F converter and then applied to a counter. When the count of the counter exceeds a preset value, the output ($b$) is produced to trip the circuit breaker 11. However, it is advantageous to use a subtractor S' as shown in FIG. 4 which determines the difference $T-T_o$ where $T_o$ represents a constant value. The output of the subtractor S' is rectified by a rectifier RF to apply only the positive voltage to the V/F converter.

Figure 6:
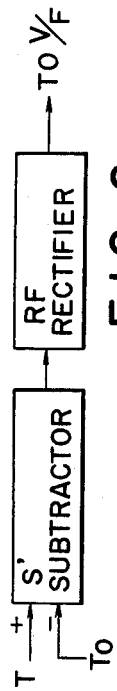
FIG. 6 is a vector diagram showing the relationship between various electric quantities of the embodiment shown in FIG. 5.
Figure 5:
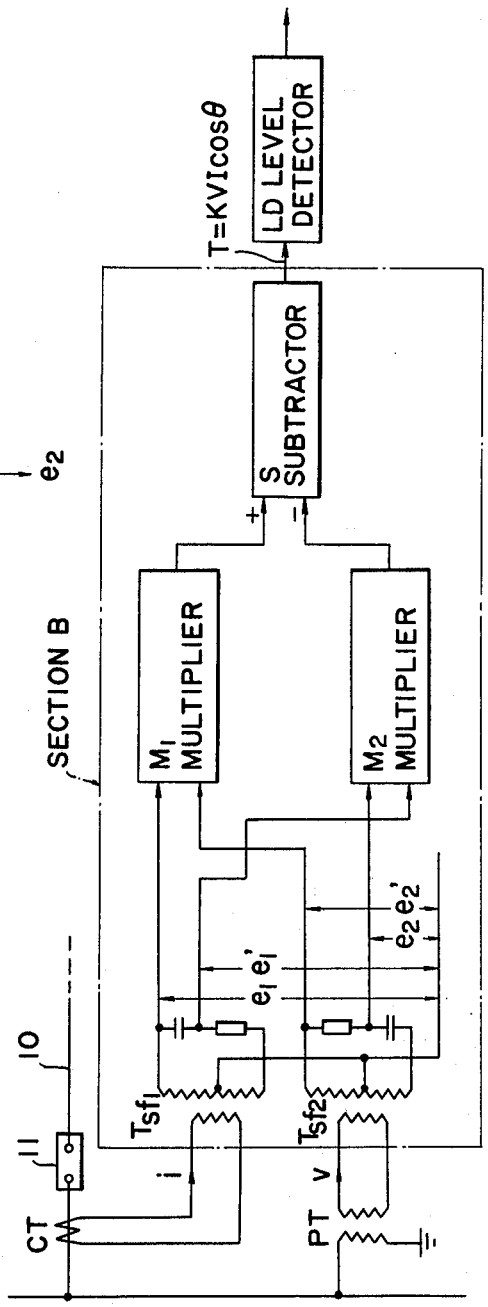
FIG. 5 is a connection diagram showing a directional relay embodying the application.

FIG. 5 shows a modified embodiment showing the application of this invention to a directional relay. In this case, current $i$ obtained by the current transformer CT, and voltage $v$ obtained by a potential transformer PT are used as the input electrical quantities for detecting the direction of a fault on the line 10. The inputs $i$ and $v$ are transformed into four electric quantities $e_1, e'_1$ and $e_2, e'_2$ by input transformers $Tsf_1$ and $Tsf_2$ in the relay, as shown in FIG. 6. When the secondary impedances of these input transformers are made equal by the capacitors and resistors on the secondary sides, the instantaneous values of these four electric quantities can be expressed as follows.

$$e_1 = E_1 \sin(\omega t + \theta)$$

$$e'_1 = E_1 \sin(\omega \omega t + \theta + 90°)$$

$$E_2 = E_2 \sin \omega t (\omega t - 90°)$$

$$e'_2 = E_2 \sin \omega t$$

where $\theta$ represents the angle of advance of $i$ with respect to $v$.

As a consequence, section B including elements from the input transformers $Tsf_1$ and $Tsf_2$ to the subtractor S produces an output $T = KVI \cos \theta$ and the level detector LD produces an output according to an equation $$T - T_o = KVI \cos \theta - T_o \geq 0$$

where $V = |v|$ and $I = |i|$

Figure 7:
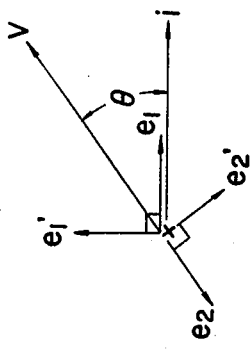
FIG. 7 is a graph showing the operating characteristic of the embodiment shown in FIG. 5.

The characteristic of the relay is shown by FIG. 7 which corresponds to the phase characteristic of a directional relay.

Figure 9:
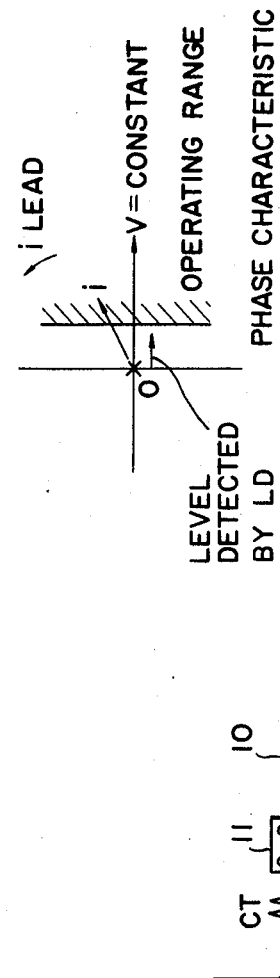
FIG. 9 is a vector diagram showing the relationship between various electric quantities of the embodiment shown in FIG. 8.
Figure 8:
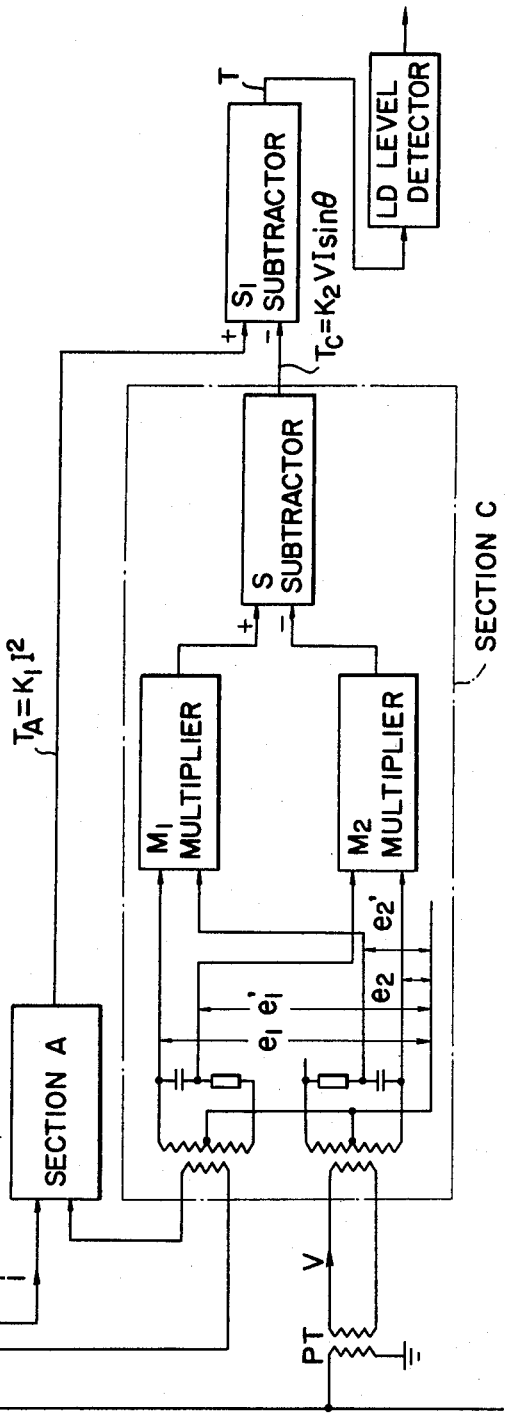
FIG. 8 is a connection diagram showing a reactance relay embodying the invention.

FIG. 8 shows another embodiment of this invention wherein the invention is applied to a reactance relay. Like the embodiment shown in FIG. 5, $i$ and $v$ are used as the input electric quantities for detecting the fact that the reactance of the line 10 has decreased below a predetermined value. In FIG. 8, section A is identical to section A shown in FIG. 2 and produces an output $$TA = K_1 I^2$$

where
  $K_1$ represents a constant.
Section C is identical to that shown in FIG. 5 except that the phases $e_2$ and $e'_2$ are different as follows.

$$e_1 = E_1 \sin \omega t$$

$$e'_1 = E_1 \sin (\omega t + 90°)$$

$$e_2 = - E_2 \sin (\omega t + \theta)$$

$$e'_2 = - E_2 \sin (\omega t + \theta + 90°)$$

where $\theta$ represents the angle of advance of $v$ with respect to $i$ (opposite to the case shown in FIG. 5). The phase relationship among these signals are shown by FIG. 9. Thus, section C produces an output $$Tc = e_1 \times e'_2 - e_2 \times e'_1 = E_1 \sin \omega t \times [- E_2 \sin (\omega t + \theta + 90°)] + E_2 \sin (\omega t + \theta) \times E_1 \sin (\omega t + 90°)$$
$$= E_1 E_2 [- \sin \omega t \cos (\omega t + \theta) + \sin (\omega t + \theta) \cos \omega t] = E_1 E_2 \sin \theta$$

$$Tc = K_2 VI \sin \theta$$

where
  $K_2$ represents a constant and $$V = |v|$$

$$I = |i|$$

Consequently, the subtractor $S_1$ produces an output $$T = T_A - T_C = K_1 I^2 - K_2 VI \sin \theta$$

The level detector LD produces an output when this output T exceeds a predetermined value To so that the operation limit of the level detector is $$K_1 I^2 - K_2 VI \sin \theta - To \geq 0$$

By dividing this equation by $I^2$, we obtain $$K_1 - K_2 (V/I) \sin \theta - (To/I^2) \geq 0$$

Hence X (the reactance component) is given by $$X = V/I \sin \theta \geq (K_1 2) - (To/K_2 I^2)$$

As a result, in a range wherein I is sufficiently large the characteristic of a reactance relay can be obtained.

By constructing a relay similar to the reactance relay described above it is possible to obtain a relay having a mho characteristic or an impedance characteristic. When a lowpass filter is connected to the output of subtractor S to provide a certain time lag it is possible to eliminate the effect of a transient and to decrease the range of unstable operation. Further, in the embodiment shown in FIG. 2 if an n-power circuit is connected before the V/F converter, it will be possible to obtain an operation time inversely proportional to the $n$th power (where $n \geq 1$) in addition to the inverse time characteristic.

In each of the foregoing embodiments while the input transformation and phase shifting were done simultaneously, they can be done separately. For example, the phase shifting can be performed by a differentiating circuit or an integrating circuit utilizing an operational amplifier. Further, it was described that the amount of phase shift of $e'_1$ and $e'_2$ with respect to $e_1$ and $e_2$ amounts to 90°. Denoting this amount of phase shift by $\phi$, it is necessary to correct the output T from subtractor 5 by $T \sin \phi$ or $\sin \phi$.

When multipliers $M_1$ and $M_2$ and subtractor S are modified such that the multipliers $M_1$ and $M_2$ produce products $e_1 \times e_2$ and $e'_1 \times e'_2$ respectively and the subtractor produces the sum of these products the following output can be obtained.

$$T = e_1 \times e_2 \; e'_1 \times e'_2 = E_1 \sin \omega t \times E_2 \sin (\omega t - \theta)$$
$$+ E_1 \sin (\omega t + 90°) \times E_2 \sin (\omega t - \theta + 90°) =$$
$$E_1 E_2 \{\sin \omega t \times \sin (\omega t - \theta) + \cos \omega t \times \cos (\omega t - \theta)\} = E_1 E_2 \cos \theta$$

This means that in FIG. 1 if $e_2$ and $e'_2$ are delayed 90° respectively, then the output from subtractor S would be expressed by $$T = e_1 \times (e'_2 \angle - 90°) - (e_2 \angle - 90°) \times e'_1 = e_1 \times e_2 + e'_2 \times e'_1$$

In other words when transforming $v_1$ and $v_2$ into $e_1$ and $e_2$ their phases are also shifted.

Instead of using a subtractor S, the same result can also be attained by inverting the polarity of the output of one multiplier by an inverter and applying the output of the inverter to an adder together with the output of the other multiplier. The same is true when the polarity of $e_2$ or $e'_1$ applied to the multiplier $M_2$ is inverted or when the polarity of $e_1$ or $e'_2$ applied to multiplier $M_1$ is inverted. For this reason in the appended claim a term "addition-subtraction circuit" is used to cover these alternative constructions.

As above described an induction relay is constituted by a static circuit which produces two electric quantities having a phase difference of $\theta$ and another two electric quantities which are dephased by $\phi$ from said two electric quantities respectively, obtain the products of two electric quantities and then adds or subtracts the products so that it is possible to provide an improved relaying apparatus free from the defects of the electromechanical type or transistor type relay. Further, by adding a level detector or a combination of a V/F converter and a counter an overload relay or inverse time relay can be provided.

We claim:
1. Protective relaying apparatus for an electric power system comprising an input transformation circuit responsive to electric quantities derived from said power system for producing a first pair of electric quantities having a phase difference $\theta$ and a second pair of electric quantities dephased by $\phi$ from said first pair of electric quantities respectively, a pair of multipliers for producing products of said first and second pairs of electric quantities, an addition-subtraction circuit for producing the algebraic difference of the outputs of said two multipliers, and a level detector connected to the output of said addition-subtraction circuit.

2. The protective relaying apparatus according to claim 1 which further comprises a circuit connected to the output of said addition-subtraction circuit for imparting an inverse time characteristic to said protective relaying apparatus.

3. The protective relaying apparatus according to claim 2 wherein said circuit comprises a voltage-frequency converter and a counter connected to the output of said voltage-frequency converter.

4. The protective relaying apparatus according to claim 1 wherein said input transformation circuit comprises a transformer and a resistor-capacitor phase shifter is connected across the secondary of said transformer.

* * * * *